(12) United States Patent
Di Martino et al.

(10) Patent No.: US 9,170,983 B2
(45) Date of Patent: Oct. 27, 2015

(54) DIGITAL AUDIO SYNTHESIZER

(75) Inventors: Joseph Di Martino, Neuves-Maisons (FR); Laurent Pierron, Nancy (FR)

(73) Assignee: Inria Institut National de Recherche en Informatique et en Automatique (FR)

( * ) Notice: Subject to any disclaimer, the term of this patent is extended or adjusted under 35 U.S.C. 154(b) by 206 days.

(21) Appl. No.: 13/806,825

(22) PCT Filed: Jun. 21, 2011

(86) PCT No.: PCT/FR2011/051425
§ 371 (c)(1),
(2), (4) Date: Dec. 24, 2012

(87) PCT Pub. No.: WO2011/161372
PCT Pub. Date: Dec. 29, 2011

(65) Prior Publication Data
US 2013/0103173 A1     Apr. 25, 2013

(30) Foreign Application Priority Data
Jun. 25, 2010  (FR) ...................................... 10 02674

(51) Int. Cl.
| | |
|---|---|
| *G06F 17/00* | (2006.01) |
| *G10L 19/00* | (2013.01) |
| *G10L 13/04* | (2013.01) |
| *G10L 13/02* | (2013.01) |
| *G10L 19/022* | (2013.01) |
| *G10L 25/18* | (2013.01) |
| *G10L 21/013* | (2013.01) |

(52) U.S. Cl.
CPC ................ *G06F 17/00* (2013.01); *G10L 13/02* (2013.01); *G10L 13/04* (2013.01); *G10L 19/00* (2013.01); *G10H 2210/155* (2013.01); *G10H 2210/285* (2013.01); *G10H 2250/005* (2013.01); *G10H 2250/031* (2013.01); *G10H 2250/235* (2013.01); *G10H 2250/281* (2013.01); *G10H 2250/471* (2013.01); *G10L 19/022* (2013.01); *G10L 25/18* (2013.01); *G10L 2021/0135* (2013.01)

(58) Field of Classification Search
None
See application file for complete search history.

(56) References Cited

U.S. PATENT DOCUMENTS

| | | | |
|---|---|---|---|
| 4,922,797 A * | 5/1990 | Chapman ........................ 84/650 |
| 5,327,521 A * | 7/1994 | Savic et al. ................... 704/272 |
| 5,401,897 A | 3/1995 | Depalle et al. | |

(Continued)

OTHER PUBLICATIONS

Maher, Robert C. "A Method for Extrapolation of Missing Digital Audio Data". Oct. 1993. AES.*

(Continued)

*Primary Examiner* — Curtis Kuntz
*Assistant Examiner* — Qin Zhu
(74) *Attorney, Agent, or Firm* — McCarter & English, LLP

(57) ABSTRACT

A digital audio synthesizer is provided that includes the following: an input memory, a computer, a combiner, and an adder. The combiner is set up to calculate an auxiliary digital data set by taking an active set of estimated digital data divided by a window function on each time window. The adder is set up to add the active set of estimated digital data multiplied by the window function having the preceding value from an accumulated total. The digital audio synthesizer also includes an extrapolator that is set up to calculate the draft digital data set for an active window from the auxiliary digital data set for the preceding window, and the auxiliary digital data set is selectively multiplied by the square of the window function.

5 Claims, 1 Drawing Sheet

(56) References Cited

U.S. PATENT DOCUMENTS

| | | | |
|---|---|---|---|
| 5,504,833 A * | 4/1996 | George et al. | 704/211 |
| 5,998,725 A * | 12/1999 | Ohta | 84/627 |
| 6,526,376 B1 * | 2/2003 | Villette et al. | 704/207 |
| 6,992,245 B2 * | 1/2006 | Kenmochi et al. | 84/622 |
| 7,257,230 B2 * | 8/2007 | Nagatani | 381/56 |
| 7,685,218 B2 * | 3/2010 | McGrath | 708/313 |
| 2002/0007273 A1 * | 1/2002 | Chen | 704/229 |
| 2003/0009336 A1 * | 1/2003 | Kenmochi et al. | 704/258 |
| 2003/0187635 A1 * | 10/2003 | Ramabadran et al. | 704/217 |
| 2004/0133423 A1 * | 7/2004 | Crockett | 704/229 |
| 2005/0010397 A1 * | 1/2005 | Sakurai et al. | 704/205 |
| 2005/0065784 A1 * | 3/2005 | McAulay et al. | 704/205 |
| 2007/0282203 A1 * | 12/2007 | Baba et al. | 600/453 |
| 2008/0046252 A1 * | 2/2008 | Zopf et al. | 704/501 |
| 2011/0087488 A1 * | 4/2011 | Morinaka et al. | 704/207 |
| 2011/0213476 A1 * | 9/2011 | Eisenberg | 700/94 |
| 2011/0288873 A1 * | 11/2011 | Nagel et al. | 704/500 |
| 2011/0320207 A1 * | 12/2011 | Rodriguez Crespo et al. | 704/260 |
| 2012/0008799 A1 * | 1/2012 | Disch et al. | 381/98 |
| 2012/0010882 A1 * | 1/2012 | Thyssen et al. | 704/226 |
| 2012/0150544 A1 * | 6/2012 | McLoughlin et al. | 704/262 |
| 2013/0044896 A1 * | 2/2013 | Ekstrand | 381/98 |

OTHER PUBLICATIONS

International Search Report of the International Searching Authority mailed on Oct. 13, 2011, issued in connection with International Patent Appln. No. PCT/FR2011/051425 (5 pages).

Griffin, et al., "Signal Estimation from Modified Short-Time Fourier Transform," IEEE Transactions on Acoustics, Speech, and Signal Processing, vol. ASSP-32, No. 2, Apr. 1984 (8 pages).

Crochiere, "A Weighted Overlap-Add Method of Short-Tine Fourier Analysis/Synthesis," IEEE Transactions on Acoustics, Speech, and Signal Processing, vol. ASSP-28, No. 1, Feb. 1980 (4 pages).

* cited by examiner

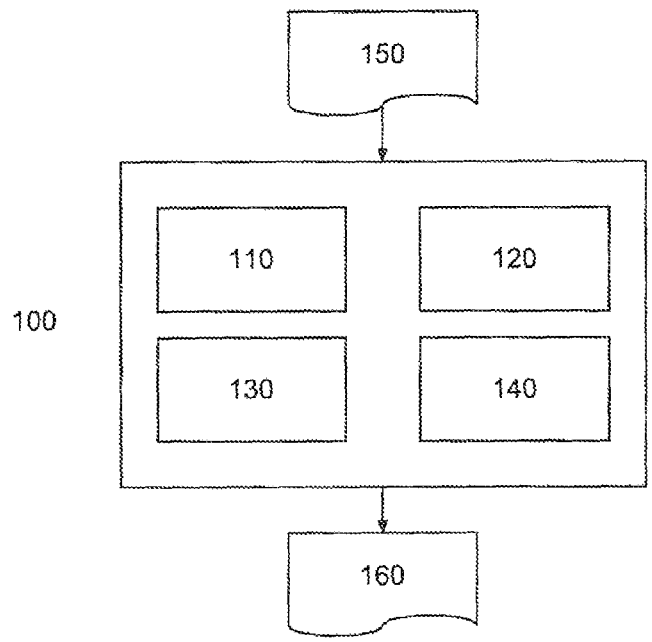
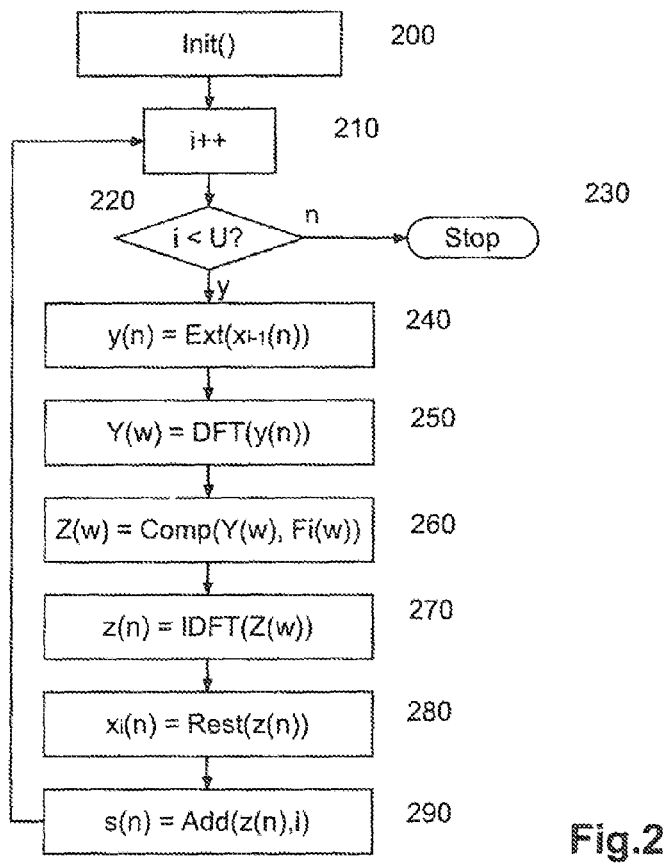
Fig.1
Fig.2

DIGITAL AUDIO SYNTHESIZER

RELATED APPLICATIONS

This application is a U.S. National Phase Application under 35 U.S.C. 371 of International Application No. PCT/FR2011/051425 filed Jun. 21, 2011, which was published on Dec. 29, 2011 under International Publication Number WO 2011/161372 A1, which claims the benefit of French Patent Application No. 1002674 filed on Jun. 25, 2010. The disclosures of these applications are incorporated herein by reference in their entirety.

The invention relates to real-time audio digital synthesis.

More particularly, the invention is applicable to fields that require performing a spectral modification of an audio signal in real-time, for example in hearing aids, video games, public address systems, etc.

Since the mid-1980s, solutions have been sought to make it possible to reconstruct an audio signal from its amplitude spectrum. To that end, these methods are based on the use of the short-term Fourier transform (STFT) under specific conditions.

These methods nevertheless have several drawbacks. First, they require working on the entire signal, which prevents working in real-time. Furthermore, these methods are based on an unbounded iterative reduction, which has a high computation cost.

The invention aims to improve this situation.

To that end, the invention proposes an audio digital synthesizer, comprising:
  an input memory for receiving a series of digital data representing the amplitude spectrum of an audio signal, over consecutive and overlapping time windows,
  a computer that is set up to receive, as an input, a draft digital data set for an active window comprising amplitude-extrapolated data at the start of the window and zero values for the rest of the window, and to establish, as a response, a digital representation of the complex discrete Fourier transform for said set,
  combiner that is set up to combine the amplitude spectrum input, corresponding to the active window in question, with the digital representation predetermined by the computer, and to call the computer with the resulting data in order to establish a digital representation of the corresponding complex inverse discrete Fourier transform that provides a set of estimated digital data relative to the active window in question; and
  an adder for selectively accumulating the estimated digital data that corresponds to a single period of time.

In this synthesizer:
  combiner is set up to calculate an auxiliary digital data set by taking the active set of estimated digital data divided by a window function on each time window;
  the adder is set up to add the active set of estimated digital data multiplied by the window function having the preceding value from the accumulated total;
  an extrapolator is set up to calculate the draft digital data set for an active window from the auxiliary digital data set for the preceding window, said auxiliary digital data set being selectively multiplied by the square of the window function.

Other features and advantages of the invention will better appear upon reading the following description, taken from examples provided as an illustration and non-limitingly, taken from the drawings, in which:

FIG. 1 shows one example embodiment of a synthesizer according to the invention, and FIG. 2 shows a flowchart of the operations carried out by the synthesizer of FIG. 1.

The detailed description is supplemented by annex A, which provides certain mathematical formulas that are used in the context of the invention. This annex is set apart for clarity reasons, and to facilitate references thereto. It is an integral part of the description, and may therefore be used not only to better understand the present invention, but also to contribute to the definition thereof, if applicable.

The drawings and the description below essentially contain elements of a definite nature. They may therefore not only be used to better understand the present invention, but also to contribute to the definition thereof, if applicable.

FIG. 1 shows an audio synthesizer 100 according to the invention. The synthesizer 100 comprises an extrapolator 110, a computer 120, a dialer 130 (e.g. combiner), and an adder 140.

During operation, the synthesizer 100 receives, as input, digital data 150 (hereafter denoted $Fi(\omega)$) representing the amplitude spectrum of an audio signal. The digital data 150 is processed by the synthesizer 100, and is returned in the form of digital audio signal data 160.

As shown in FIG. 2, the synthesizer 100 works over consecutive and overlapping time windows. In the example described here, these windows pertain to a number U of frames in the audio signal one wishes to resynthesize.

Each frame comprises N samples, the last L of which are extrapolated. L is selected in the example described here as being a divisor of the size N of the STFT. Preferably, N is a multiple of 4 L. The audio synthesizer 100 operates based on a loop, in which a frame is extrapolated upon each iteration.

The synthesizer 100 operates according to the flowchart of FIG. 2.

In a first operation 200, the audio synthesis is initialized using a function Init( ). The function Init( ) prepares the variables and parameters that will be used in the synthesis and assigns them original values. In the example described here, the function Init( ) is performed by the dialer 130.

These variables and parameters are:
  N: the number of samples of the Fourier transform; N is also the number of samples of each frame,
  L: the number of samples extrapolated per iteration,
  U: the number of iterations,
  $x_0(n)=0$ for n comprised between 0 and N−1. Upon each iteration, a signal $x_i(n)$ is calculated, which serves as auxiliary data for the extrapolation of the following iteration,
  $s(n)=0$ for n comprised between 0 and U*L+N−1, where $s(n)$ is the resynthesized signal, the counter i is initialized at 0.

Once all of the variables have been initialized, the resynthesis loop begins at 210 with the incrementation of the counter i. Then, a test on the value of the counter i in an operation 220 may trigger a loop exit operation 230 if all of the frames have been processed.

Otherwise, draft data $y(n)$ is calculated in an operation 240 using a function Ext( ). In the example described here, the function Ext( ) is performed by the extrapolator 110. The function Ext( ) uses the auxiliary data $x_{i-1}(n)$ as argument.

For all of the iterations, the auxiliary data $x_{1-1}(n)$ is calculated in the previous iteration, except for the first, where $x_0(n)$ is calculated by the function Init( ).

For each n varying between 0 and N−L−1, the function Ext( ) defines $y(n)$ as the product of the data $x_{i-1}(n+L)$ by the square of a window function $H(n)$ according to formula (10) provided in annex A. For each n varying between N−L and N−1, the function Ext( ) defines $y(n)$ equal to 0.

Then, the computer 120 is called upon in an operation 250 to calculate the discrete Fourier transform of y(n) using a function DFT( ). The result of this function is stored in data Y(w) where w varies between 0 and N−1, according to formula (20) of annex A.

The dialer 130 is then called upon in an operation 260 to combine the data Y(w) with data $F_i(w)$ to produce data Z(w), using a function Comp( ).

The data $F_i(w)$ is amplitude spectrum data of the signal to be resynthesized corresponding to the frame of the current iteration. In the example described here, the data $F_i(w)$ is calculated by STFT of the signal to be resynthesized, using the function H(n) as the window function.

The function Comp( ) combines the data Y(w) with the data $F_i(w)$ by applying the module $F_i(w)$ to the data Y(w). Thus, in the data Z(w), the draft data phase y(n) is kept, and the energy from the frame to be resynthesized is reintroduced.

In the example described here, the data Fi(w) is received as input. However, the synthesizer 100 may comprise an audio spectrometer to calculate these coefficients and provide them to the dialer 130.

The synthesizer may also comprise a component placed between the spectrometer and the input memory capable of modifying the digital data representative of the input amplitude spectrum, and to transmit the modified amplitude spectrum data to the input memory.

This component can apply any preprocessing algorithm or filter to the amplitude spectrum, for example in the context of a transformation of the type transforming the esophageal voice into the laryngeal voice.

The data Z(w) is then returned to the computer 120 in an operation 270. In that operation, the computer 120 executes a function IDFT( ) that performs the inverse of the operation 250, and stores the result in data z(n), according to formula (30) of annex A.

The dialer 130 is then called upon again in an operation 280 to calculate the auxiliary data $x_i(n)$ for the following iteration. This operation is done using a function Rest( ) that receives the data z(n) as input, and divides it by the window function H(n).

Lastly, the resynthesized signal s(n) is lastly calculated in an operation 290 using a function Add( ), then the loop resumes in 210. The function Add( ) is carried out by the adder 140, and receives the data z(n) and the counter i as arguments. The function Add( ) then adds the data z(n) multiplied by the window function H(n) to the resynthesized data with index s(i*L+n), according to formula (40) of annex A.

As was mentioned in the introduction, the field of resynthesis from the amplitude spectrum is a field that is poorly known and difficult to understand. This field calls for mastery of short-term Fourier transforms (STFT), the physical meaning of which has still not been mastered.

Although the phenomena in question are not fully understood, it is possible to provide at least a partial explanation of them, as will be seen now.

Each iteration makes it possible to extrapolate the L samples of a current frame. Since these samples are the continuation of the preceding frames, the auxiliary data $x_{i-1}(n)$ therefore already contains a large quantity of the signal.

That is why the auxiliary data $x_{-1}(n)$ is first shifted to the left by L indices, and the last L elements are left zero. Then, the draft data used to calculate the resynthesis data is multiplied by the window function H(n) squared. The window function used in the example described here is a normalized Hamming window, the formula for which is provided in (50) in annex A.

In fact, the operation 250 is a modified STFT, because it is the square of the window function that is applied instead of the window function. That is why the data z(n) is divided by the window function H(n) to give the auxiliary data $x_i(n)$ in the operation 280.

The multiplications and divisions by the window function are not done randomly. In fact, it is possible to consider eliminating the division from the operation 280 and performing a simple multiplication in the operation 240 instead of multiplication by the square.

But this would not account for the fact that the multiplication of the operation 250 is done over the $x_{-1}(n)$ offset relative to those of the operation 280. And this detail is crucial, as it makes it possible to use a signal $x_i(n)$ that is a sort of "idealized" vision of the resynthesized audio signal.

Conversely, the resynthesized data s(n) is windowed relative to the data z(n). This is done so as to obtain a smoothing effect of the overlap-add (OLA) type, and makes it possible to limit discontinuities at the ends of the frames.

The annex A and these explanations are not just a series of theoretical mathematical formulas. Thus, the Applicant first used a formula (50) with a simple multiplication instead of multiplication by the square.

The experiments not being satisfactory, its research led it to use the square of that window. This is advantageous because multiplication by the square of the window function ensures normalization and saves one computation step.

Other functions could be used for the window function, such as the normalized Hann window or another normalized window. The use of the normalized window is important because it makes it possible on the one hand to smooth the resynthesized data s(n) without it being necessary on the other hand to normalize the latter at the end of resynthesis.

In fact, without smoothing, artifacts would appear at the borders of the frames. And without a normalized window, it would be necessary to take all of the produced elements into account to normalize, which would prevent a real-time application.

Annex A $$0 \leq n < N - L \quad y(n) = x_{i-1}(n + L) * H(n)^2 \quad (10)$$
$$N - L \leq n < N \quad y(n) = 0$$

$$Y(w) = \sum_{n=0}^{n=N-1} y(n) * e^{\frac{-2\pi i * w * n}{N}} \quad (20)$$

$$z(n) = \frac{1}{N} \sum_{w=0}^{w=N-1} Z(w) * e^{\frac{2\pi i * w * n}{N}} \quad (30)$$

$$s(i*L+n) = s(i*L+n) + z(n) * H(n) \quad (40)$$

$$H(n) = \frac{2 * \sqrt{L/N}}{\sqrt{4 * 0.54^2 + 2 * 0.46^2}} * \left(0.54 - 0.46 * \cos\left(\frac{(2n+1)*\pi}{N}\right)\right) \quad (50)$$

The invention claimed is:

1. A digital audio synthesizer, comprising:
   an input memory for receiving a series of digital data representing the amplitude spectrum of an audio signal, over consecutive and overlapping time windows,
   a computer that is set up to receive, as an input, a draft digital data set for an active window comprising amplitude-extrapolated data at the start of the window and zero values for the rest of the window, and to establish, as a response, a digital representation of the complex discrete Fourier transform for said set, a combiner that is set up to combine the amplitude spectrum input, corresponding to the active window in question, with the digital representation predetermined by the computer, and to call the computer with the resulting data in order to establish a digital representation of the corresponding complex inverse discrete Fourier transform that provides a set of estimated digital data relative to the active window in question; and an adder for selectively accumulating the estimated digital data that corresponds to a single period of time, characterized in that:

the combiner is set up to calculate an auxiliary digital data set by taking the active set of estimated digital data divided by a window function on each time window;

the adder is set up to add the active set of estimated digital data multiplied by the window function having the preceding value from the accumulated total; and in that it comprises an extrapolator that is set up to calculate the draft digital data set for an active window from the auxiliary digital data set for the preceding window, said auxiliary digital data set being selectively multiplied by the square of the window function.

2. The synthesizer according to claim 1, wherein the extrapolator calculates the draft digital data set for an active window by shifting the auxiliary digital data set from the previous window to the left by L indices, setting the last L samples of the shifted set to zero, then multiplying term to term by the square of the window function.

3. The synthesizer according to claim 1, wherein the window function comprises a normalized Hamming window function.

4. The synthesizer according to claim 1, also comprising a spectrometer arranged to calculate a digital data series that represents the amplitude spectrum of an audio signal as an input, and to transmit that data to the input memory.

5. The synthesizer according to claim 4, comprising a component placed between the spectrometer and the input memory capable of modifying the digital data that represents the amplitude spectrum as an input, and to transmit the modified amplitude spectrum data to the input memory.

\* \* \* \* \*

UNITED STATES PATENT AND TRADEMARK OFFICE
CERTIFICATE OF CORRECTION

| | | |
|---|---|---|
| PATENT NO. | : 9,170,983 B2 | |
| APPLICATION NO. | : 13/806825 | |
| DATED | : October 27, 2015 | |
| INVENTOR(S) | : Joseph Di Martino et al. | |

It is certified that error appears in the above-identified patent and that said Letters Patent is hereby corrected as shown below:

ON THE TITLE PAGE

On Page 1, under Assignee, "Universite de Lorraine (FR)" should be listed as the second Assignee;

IN THE SPECIFICATION

In Column 1, line 51, the word --the-- should be inserted at the beginning of the sentence;

In Column 3, line 61, "$x_{-1}(n)$" should be deleted and replaced with "$x_{i-1}(n);$"; and In Column 4, line 12, "$x_{-1}(n)$" should be deleted and replaced with "$x_{i-1}(n).$".

Signed and Sealed this
Twenty-sixth Day of April, 2016

Michelle K. Lee
*Director of the United States Patent and Trademark Office*